United States Patent Office 2,913,441
Patented Nov. 17, 1959

2,913,441

PROCESS FOR PREPARATION OF METHYL-ALPHA-CHLOROACRYLATE POLYMER

Harry D. Anspon, Easton, and Frank E. Pschorr, Phoenixville, Pa., assignors to General Aniline & Film Corporation, New York, N.Y., a corporation of Delaware No Drawing. Application January 4, 1956
Serial No. 557,250

4 Claims. (Cl. 260—89.5)

This invention relates to an improvement in mass polymerization of methyl-alpha-chloroacrylate and in the resulting mass polymer. It is an object of the invention to provide monomeric methyl-alpha-chloroacrylate having improved susceptibility to polymerization and yielding a polymer having improved stability to elevated temperatures.

In the preparation of methyl-alpha-chloroacrylate (e.g., by dehydrochlorination of methyl-alpha-beta-dichloropropionate), a polymerization inhibitor, usually of phenolic character such as para-tertiary butyl catechol, is ordinarily included in the reaction mixture to avoid losses due to premature polymerization. Such inhibitors are also generally included in the resulting monomer during storage until it is used for the preparation of a polymer. These inhibitors require removal before polymerization, and this has been heretofore accomplished either by washing with aqueous alkali and/or by vacuum distillation of the monomer. These treatments tend to cause contamination of the monomer, due to saponification thereof, or due to premature polymerization during distillation to remove the inhibitor. Moreover, traces of inhibitor remaining in the monomer impair its reactivity in the polymerization reaction.

Small amounts of moisture, as well as alcohol, such as methanol, in methyl-alpha-chloroacrylate inhibit discoloration of the resulting polymer when exposed to heat, light and air, but also tend to impair the clarity of the polymer and its stability when exposed to elevated temperatures. For example, at 160° C., the presence of moisture or alcohol tends to cause haziness or bubble-formation in the polymer. Impairment of optical clarity in the polymer seriously limits its usefulness, especially for glazing in aircraft and other vehicles.

We have discovered that the aforesaid disadvantages can be avoided by subjecting methyl-alpha-chloroacrylate to treatment with a pentoxide of an element of group V–A of the periodic table of elements having an atomic number from 15 to 51 (i.e., a pentoxide of phosphorus, arsenic or antimony), and especially phosphorus pentoxide, and separating the monomer from undissolved material immediately prior to polymerization of the monomer. In this way, the monomeric methyl-alpha-chloroacrylate has been found to acquire increased reactivity in polymerization and the resulting polymer has improved stability to bubble formation when exposed to elevated temperatures.

While it is not desired to limit the invention to any theory of operation, it is probable that moisture, alcohols and phenolic compounds are absorbed or converted by phosphorus pentoxide into easily separable insoluble form, or are converted to substances which have no deleterious effect upon the polymer produced from the methyl-alpha-chloroacrylate.

The invention will be more fully understood from the following examples, wherein parts and percentages are by weight:

Example 1

To each of 3 portions, amounting respectively to 20 parts, of steam-distilled methyl-alpha-chloroacrylate containing small amounts of moisture, methanol and para-tertiary butyl catechol there was added 1 part of phosphorus pentoxide, while maintaining the temperature at $-35°$ C. The resulting mixtures were agitated respectively for 1, 1½ and 4½ hours, and were then filtered to separate the monomer from insoluble phosphorus pentoxide. The resulting monomer samples were subjected to mass polymerization by exposure to ultra-violet light, and the time which elapsed to the point at which the polymer attained maximum temperature due to heat of polymerization was observed. The observed time intervals provided an indication of the reactivity of the monomer in polymerization. The results were as follows:

| Time of contact of methyl-alpha-chloroacrylate with $P_2O_5$ (Hours) | Hours elapsed to attain peak temperature during polymerization |
|---|---|
| 1 | 22½ |
| 1½ | 16½ |
| 4½ | 13 |

Thus, contact with phosphorus pentoxide under the aforesaid conditions increased the reactivity toward polymerization substantially as the duration of such contact was increased.

Example 2

To 2 portions, each 100 parts, of the methyl-alpha-chloroacrylate employed in the preceding examples, there were added, respectively, 1.82 and 0.77 part of phosphorus pentoxide, and the resulting mixtures agitated at 19–20° C. for about 3 hours. After filtering out insoluble phosphorus pentoxide, the samples of methyl-alpha-chloroacrylate were polymerized as in Example 1, and the time observed which elapsed from the beginning of polymerization to the point at which heat emission ceased at room temperature. The results were as follows:

| Amount of $P_2O_5$, parts | Time elapsed to end of heat emission, hours |
|---|---|
| 1.82 | 12 |
| 0.77 | 18 |

The increased amounts of phosphorus pentoxide thus increased the reactivity of the monomer in polymerization.

Example 3

100 parts of the methyl-alpha-chloroacrylate of Example 1 were agitated for 2.33 hours at 18–20° C. with 1.85 parts of phosphorus pentoxide. After filtering, the monomer was polymerized by exposure to ultra-violet light in a mold having plates spaced ¼" apart so as to yield a polymer sheet ¼" thick. The sheet was then heated in an oven at 160° C. for successive ½-hour intervals, and cooled between each ½-hour interval to room temperature. The first bubble visible to the naked eye was observed after the tenth ½-hour period of heating at 160° C.

For purposes of comparison, the foregoing procedure was repeated, except that in one case, 1.85 parts of anhydrous aluminum oxide, and in the other case, 1.85 parts of silica gel, each adapted to absorb moisture, were substituted for phosphorus pentoxide. Polymer sheets produced from methyl-alpha-chloroacrylate treated in this manner, when heated at 160° C. for successive ½-hour intervals, showed initial bubble formation after 4 periods of heating. The surprisingly superior effect of phosphorus pentoxide is clearly shown by this comparison.

Example 4

150 parts of methyl-alpha-chloroacrylate, as employed in Example 1, were mixed with 2.5 parts of phosphorus pentoxide and agitated therewith for 2 hours at 18–20° C. After filtration, the monomeric methyl-alpha-chloroacrylate was polymerized in the form of a ¼" sheet, and the latter subjected to heating at 160° C. for successive ½-hour intervals, as in the preceding example. Initial bubble formation was noted after the eighth heating period.

As a comparison, to show the effect of contaminants, 2 portions of the monomer, treated as described in this example with phosphorus pentoxide, were respectively mixed with 1 mol percent of methanol, and with 1 mol percent each of methanol and methyl-alpha-beta-dichloropropionate. The samples of monomer thus contaminated were polymerized in the form of sheets and heated at 160° C. for successive ½-hour intervals. Initial bubble formation was found in the case of the sheet containing methanol after the seventh ½-hour heating period, while in the case of the sheet containing methanol as well as methyl - alpha - beta-dichloropropionate, initial bubble formation occurred after the fifth ½-hour heating period.

In the foregoing examples, similar results are obtained when equivalent amounts of arsenic pentoxide or antimony pentoxide are substituted for phosphorus pentoxide.

In applying the aforesaid pentoxides, and especially phosphorus pentoxide, for the purposes of this invention, the quantity used is preferably in excess of 1 mol per mol of moisture, alcohols, or phenolic components which are present as contaminants in the methyl-alpha-chloroacrylate monomer. Since such contaminants are normally present in amounts less than ½ mol percent, the amount of phosphorus pentoxide normally suitable for the treatment of this invention ranges substantially frrom 1% to 5% of the weight of the monomer. Larger amounts of phosphorus pentoxide can be used, whereby some acceleration of the contaminant absorption is effected. Similar acceleration results from increased agitation.

Purification treatment can be carried out over a wide range of temperatures—for example, from the freezing point of methyl-alpha-chloroacrylate to temperatures moderately above room temperature, at which thermal polymerization is not materially promoted, e.g., at temperatures up to about 50° C.

Separation of the pentoxide containing the contaminants can be readily effected by filtration. The monomer is advantageously maintained under an inert atmosphere such as nitrogen or $CO_2$ during the purification treatment and until polymerization is substantially complete, so as to avoid formation of auto-oxidation products. Should the monomer be exposed to oxygen-containing gases prior to polymerization, it is preferable to maintain it at a temperature adjacent the freezing point (e.g., at about $-35°$ C.) during such exposure.

Mass polymerization of the purified monomer is effected by known methods, including exposure to ultraviolet light, heat and/or free radical generating catalysts, especially organic peroxides such as benzoyl, acetyl or di-tertiary butyl peroxide and others, such as dibutyl tin diacetate. Polymer sheets are prepared by polymerizing the monomer between spaced glass plates having a gasket or edge-seal adjacent or around the edges to enclose the space between them.

Polymerization products from methyl-alpha-chloroacrylate, treated in accordance with this invention, show exceptional resistance to softening and bubble formation at elevated temperatures, e.g., at 160° C., and are characterized by excellent clarity.

Variations and modifications, which will be obvious to those skilled in the art, can be made in the procedures hereinabove described and illustrated, without departing from the spirit or scope of the invention.

We claim:

1. In the preparation of a mass polymer of methyl-alpha-chloroacrylate from the corresponding monomer containing as impurities, moisture and at least one member of the group consisting of alcohols and a trace of phenolic polymerization inhibitor, the improvement which consists in contacting said monomer with a pentoxide of an element of group V–A of the periodic table of elements having an atomic number from 15 to 51, separating the undissolved residue from the monomer, and thereupon mass polymerizing the resulting monomeric methyl-alpha-chloroacrylate.

2. A process as defined in claim 1, in which the pentoxide is phosphorus pentoxide.

3. A process as defined in claim 2, in which the monomer is contacted with phosphorus pentoxide at $-35$ to 50° C., and the amount of phosphorus pentoxide is in excess of 1 mol per mol of moisture, alcohols, and phenolic compounds present in the monomer.

4. A process as defined in claim 2, wherein the phosphorus pentoxide is employed in an amount corresponding to 1–5 mol percent of the monomer.

References Cited in the file of this patent

UNITED STATES PATENTS

| 2,247,790 | Strain et al. | July 1, 1941 |
| 2,338,967 | Pollack | Jan. 11, 1944 |

OTHER REFERENCES

Brewster: Organic Chemistry, Prentice-Hall, Inc., 1953, page 63.

Merck Index, Merck & Co., Inc., Rahway, New Jersey, 6th edition, 1952, page 753, "Phosphorus Pentoxide."